INVENTOR:
Fred N. Schwend

Aug. 7, 1945.　　　F. N. SCHWEND　　　2,381,842
AIRCRAFT WHEEL CONTROL DEVICE
Filed Sept. 16, 1943　　　4 Sheets-Sheet 4

INVENTOR:
Fred N. Schwend

Patented Aug. 7, 1945

2,381,842

UNITED STATES PATENT OFFICE 2,381,842

AIRCRAFT WHEEL CONTROL DEVICE

Fred N. Schwend, Berkeley, Calif.

Application September 16, 1943, Serial No. 502,615

11 Claims. (Cl. 244—103)

The present invention relates to aircraft wheel driving and braking mechanism and has particular reference to controls for aircraft landing wheels.

As is well known, the wheels of airplanes, particularly if they are relatively heavy, are subject to considerable skidding when they first touch the ground in landing and this tends to reduce the life of the landing wheel tires as well as to increase the possibility of damage upon landing.

Further, and especially with aircraft of considerable size, difficulty has been encountered in dissipating the heat generated by the usual friction type brakes, this heat at times damaging the tires and wheels as well as requiring frequent replacement of the parts.

The present invention is aimed at overcoming the above and other shortcomings and one object is to rotate the landing wheels of an aircraft prior to and as an incident to landing.

Another object is to automatically control a wheel spinning device and to obviate the necessity of attention thereto by the operator.

A further object is to spin the landing wheels of an aircraft at a speed commensurate with the landing speed of the craft.

A further object is to eliminate high-pressure fluid brake lines inherent in conventional hydraulic brakes.

A further object is to provide a unitary brake and wheel spinning device.

The manner in which the above and other objects of the invention are accomplished will be readily understood on reference to the following specification when read in conjunction with the accompanying drawings wherein.

Figure 1:
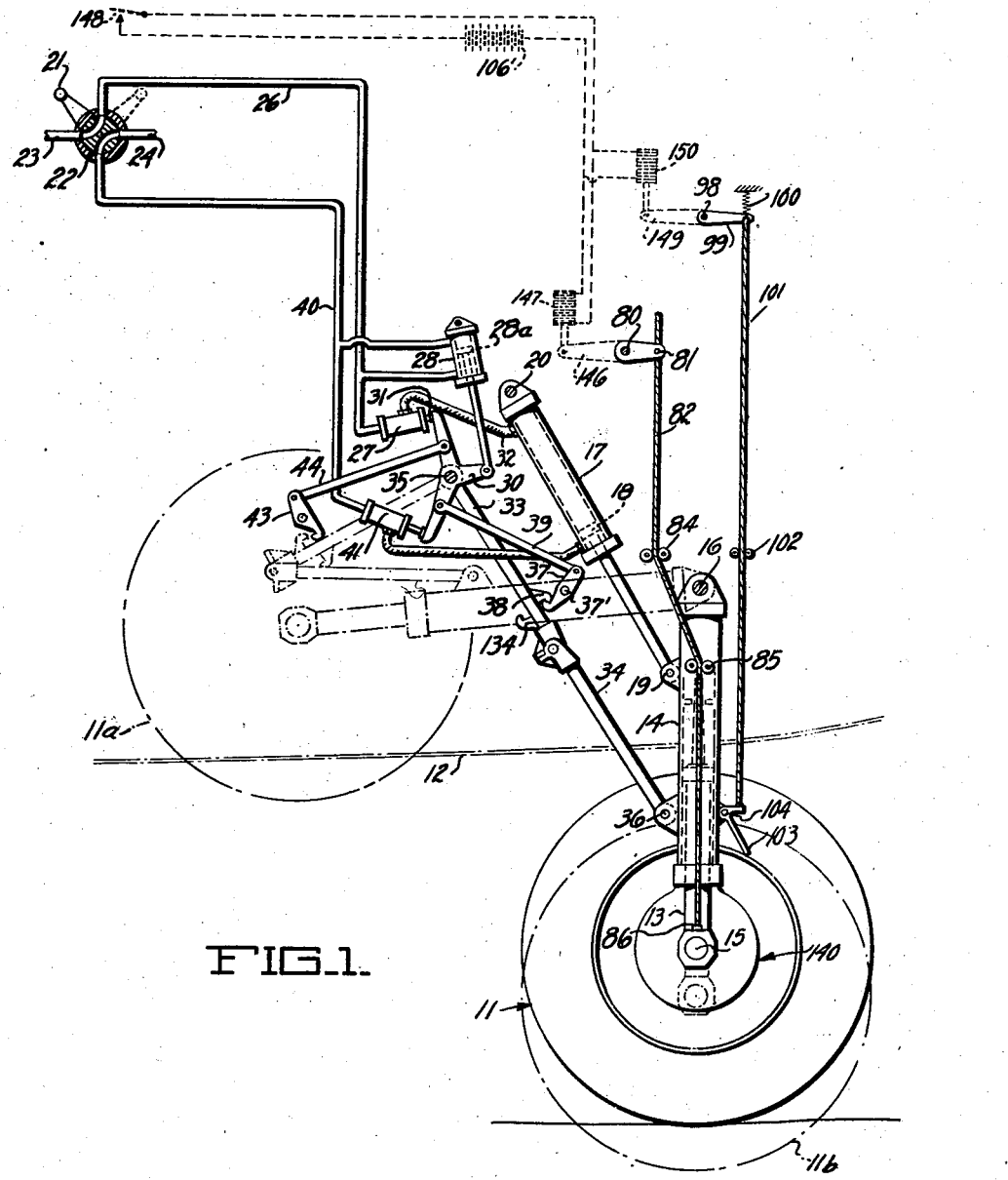
Fig. 1 is a side view of a retractable and extensible landing gear combined with the present invention.

Referring to the drawings, the landing wheels, one of which is shown at 11 (Fig. 1), are retractable within the hull 12 of the aircraft. Since mechanism for retracting and extending the landing wheels is well known in the art and since such mechanism enters into cooperative relationship with other parts of the present invention, only a brief description of such mechanism will be given to indicate the relationship thereof with the component parts of the control mechanism for the motor-brake unit.

Figure 4:
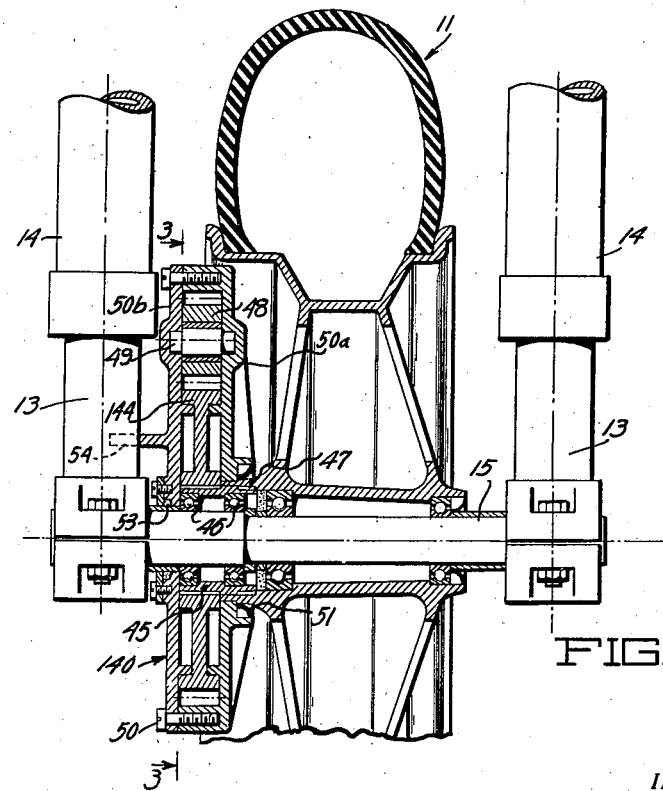
Fig. 4 is a transverse sectional view taken along the line 4—4 of Fig. 3.
Figure 5:
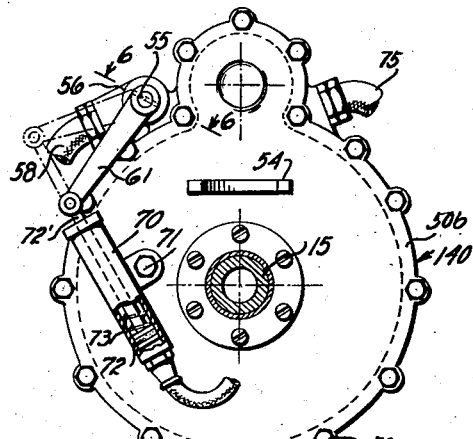
Fig. 5 is an outside view of a motor-brake unit and illustrating the brake control valve cylinder partly in section.
Figure 6:
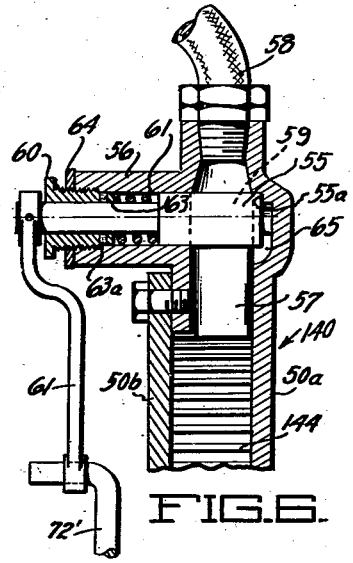
Fig. 6 is a transverse view of the control valve and is taken along the line 6—6 of Fig. 5.

The wheels 11 are attached to the well known form of "oleo" shock absorbing unit comprising, for each wheel, a pair of telescoping pistons 13 and cylinders 14, the former rigidly secured to the shaft 15 of the respective landing wheel in the manner shown, for example, in Fig. 4, and the latter pivoted on a pin 16 fixed to the framework of the aircraft.

Each wheel is movable from its extended position illustrated in full lines or in dotted lines 11b (Fig. 1) to its dotted line position 11a within the hull 12 by a hydraulic cylinder 17 pivoted at 20 to the framework of the aircraft and having the rod of the piston 18 thereof pivotally connected at 19 to the cylinder 14.

Retraction and extension of the landing wheels is controlled by a handle 21 attached to a two-way valve schematically indicated at 22, and when the handle is moved from its full line position to its dotted line position the wheels will be retracted and held retracted while movement in an opposite manner will effect extension of the wheels. When the handle is in its position illustrated in Fig. 1, the valve 22 connects a hydraulic tube or line 23 leading from the usual landing gear pressure supply pump to a line 26 connected in parallel to the lower end of a latch release cylinder 28 and a sequence control valve 27. This type of valve is of conventional design well known in the art and will therefore not be disclosed in detail. However, it comprises a valve stem 31 spring pressed outwardly which normally prevents passage of fluid from the line 26 into a flexible line 32 leading into the upper end of the cylinder 17. When said valve stem is pressed inward as indicated in Fig. 1 the fluid may, however, flow freely through the valve. The valve stem is ineffective to prevent a flow in the opposite direction.

Pressure on the lower end of the piston 28a within cylinder 28 causes the piston to move upward and to rock a three-armed lever 30 connected thereto counter-clockwise about a pin 35 fixed to the aircraft framework, depressing the valve stem 31 of the sequence valve 27 and thus communicating the line 26 with the flexible line 32. Fluid passing through the latter line now holds the piston 18 extended as shown in Fig. 1.

The upper end of cylinder 28 is now connected in parallel with a second sequence valve 41 to a line 40 which is communicated by valve 22 with a line 24 leading to the inlet side of the aforementioned pump or to a reservoir in circuit therewith.

An articulated strut comprising two pivotally connected sections 33—34 is provided, connected at one end thereof by pin 36 to the cylinder 14 and pivoted at the other end on the aforementioned frame pin 35. As each wheel 11 moves into its fully extended position, a latch 37 pivoted at 37' on the aircraft framework engages a hook 38 on the section 33 thereby locking the articulated strut in extended position to prevent collapse of the landing gear.

Movement of the valve handle 21 from its full line to its dotted line position communicates the pressure line 23 with the line 40 extending to the upper end of cylinder 28 and the sequence valve 41 while communicating the return line 24 with the line 26 extending to the lower end of cylinder 28 and the valve 27. Consequently, the piston 28a is forced downward, rocking the lever 30 clockwise to close the valve 27 and open valve 41 to transmit fluid from the pressure line 23 to the lower side of piston 18. Lever 30 is connected by link 39 to latch 37 whereby the latter is now released from hook 38. Therefore, each oleo unit 13—14 and wheel 11 will be rocked upward about pivot 16 until wheel 11 reaches the dotted line position 11a where it is latched. For this purpose, a second hook 134 is mounted on the upper section 33 of the articulated strut, and as the strut collapses as an incident to the retraction of the wheel unit the hook 134 is engaged by a second latch 43 also pivoted on the framework. Latch 43 is connected by link 44 to lever 30 so that clockwise rocking of the latter moves latch 43 to latching position. On the other hand, counter-clockwise rocking of lever 30 will disengage latch 43 and move latch 37 to latching position.

Describing now the means for spinning and braking the wheels, embodying the present invention, each wheel 11 has attached thereto a fluid motor-brake unit, generally indicated at 140 (Figs. 2 to 6, inclusive). In its preferred form, the unit is of the hydraulic gear type, the basic principle of which is well known and used as either a pump, motor or brake. It is to be understood, however, that other well known forms of fluid motor-brake units may be employed without departing from the spirit of the basic aspects of the present invention.

Figure 3:
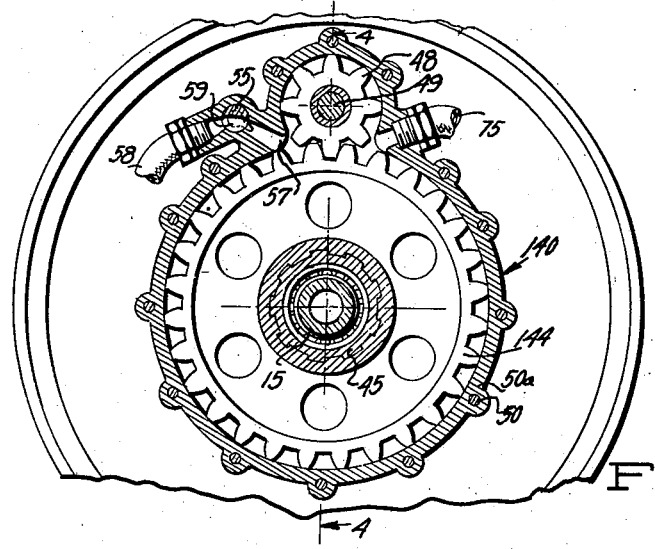
Fig. 3 is a sectional view of one of the fluid motor-brake units and is taken along the line 3—3 of Fig. 4.

Referring to Figs. 3 and 4, each unit 140 comprises a spur gear 144 splined to a connecting sleeve 45 which is rotatably mounted on ball bearings 46 fitted on the wheel axle 15. The sleeve 45 is also splined at 47 to the hub of the wheel 11 thereby forming an integral connection between the wheel and the gear 144 while permitting ready disassembly of these elements.

Gear 144 meshes with a smaller gear 48 journaled on a stub shaft 49 supported in a casing which encloses both gears 144 and 48. The casing is formed in two sections comprising a base 50a and a cover 50b. The base section 50a is fitted over the hub of wheel 11 and a lubricant retaining seal 51 is interposed between the hub and the base to prevent leakage of the bearing lubricant or braking fluid. The cover 50b is securely bolted to the base section by bolts 50 and is tightly fitted over a sleeve 52 mounted on the axle 15, a lubricant retaining device 53 being provided to prevent leakage of lubricant or fluid between the fitted surfaces of the cover and sleeve.

An extension 54 (see also Fig. 5) is formed on the cover section 50b and embraces one of the pistons 13 of the oleo assembly so as to prevent relative rotation between the motor-brake unit and the oleo assembly when the former exerts a torque in functioning as a brake or motor.

The discharge side of the unit 140 is provided with a brake valve 55 (Figs. 3, 5 and 6) journaled in an extension 56 formed in the base section 50a and extends into a passage 57 communicating the discharge side of the gears 144 and 48 with a flexible discharge tube 58. The valve has a slot 59 (Figs. 3 and 6) therein normally permitting unrestricted passage of fluid through passage 57 while enabling a variable restriction of the passage to be obtained by rotating the valve. The valve 55 has a shank extending through a bushing 60 threaded into the extension 56 and a compression spring 61 is interposed between the valve proper and a bearing ring 63 abutting a sealing ring 63a adjacent the inner end of bushing 60 to normally press the valve 55 longitudinally to lie against a seat 55a formed in the base 50a. The strength of spring 61 may be varied by screwing the bushing 60 in or out, a lock nut 64 being provided to lock the same in an adjusted position.

A pilot chamber 65 is formed in the seat 55a for the valve 55 and communicates with the passage 57 on the side adjacent the gears 144 and 48 to permit by-passing of the fluid past the valve under certain conditions to be set forth hereinafter.

The brake valves 55 are controlled by foot pedals 66 (Fig. 2) which may be of conventional design, being pivotally supported at 67.

Although any desired control media may be employed I prefer to utilize hydraulic controls comprising actuating cylinders 68, the pistons of which are operated by levers 69 attached to the pedals 66. Each cylinder 68 is connected by a line 69 to a valve operating cylinder 70 (see also Fig. 5) pivoted at 71 to the cover 50b of the respective brake unit. The piston 72 of cylinder 70 is normally spring pressed into the position shown in Fig. 5 by a spring 73 interposed between the piston 72 and head of the cylinder. The piston rod 72' is bent at right angles (see Fig. 6) and is fitted in a bearing formed on a lever 61 attached to the valve 55. Thus, extension of the piston 72 will rock valve 55 causing the slot 59 to be so positioned that the valve restricts the passage 57.

From the above it will be seen that depression of either one of the brake levers 66 will result in operation of the respective piston 72 to restrict the discharge port of the associated unit an amount dependent upon the extent of movement of the corresponding brake pedal and this consequently applies a braking force to the wheels.

In view of the fact that any heat generated by the units 40 when acting as brakes may be dissipated by the hydraulic fluid which may thereafter be cooled by passage through the various lines to be described as well as through a suitable fluid cooler (not shown) if desired, it be seen that the transmission of excess heat to the wheels and tires will be materially reduced.

The construction of each brake valve 55 prevents locking of the wheels in the event that the brake pedals are depressed too quickly by permitting by-passing of the fluid past the valves. That is, whenever the pressure built up by the fluid in passing through each unit exceeds a predetermined amount determined by the adjustment of the bushing 60, the fluid in the chamber 65 presses the valve 55 to the left in Fig. 6 against the spring 61 whereby the fluid may readily pass into the discharge tube 58. The maximum allowable pressure may, for example, be regulated to prevent skidding of the wheels at various speeds.

Means automatically responsive to the extension and retraction of the landing wheels are provided to control the units 140 as either motors or brakes. As diagrammatically illustrated in Fig. 2, the intake port of each unit is connected through a flexible line 75 with a two-way selector valve 76 adapted to communicate the line 75 with either a braking selector valve 77 or a pump 78. The rotatable elements of valve 76 are attached to a shaft 80 having an arm 81 thereon connected to a cable 82. This cable (see Fig. 1) is guided between two sets of rollers 84 and 85, the former pivoted on studs mounted on the aircraft framework and the latter pivoted on studs extending from the cylinder 14. The lower end of the cable 82 is attached at 86 to the lower extremity of the piston 13. The upper end of the cable is attached to a tension spring 87 tending to raise the cable and thereby rock the shaft 80 and control elements of the valves 76 into their positions illustrated in Fig. 2. However, when the wheels 11 are extended, and before the aircraft has landed, the wheels will assume positions corresponding to those indicated at 11b, Fig. 1, due to extension of pistons 13, resulting in the cable 82 being lowered against the action of spring 87 to rock the shaft 80, thereby setting the valves 76 to communicate the lines 75 with line 95.

Figure 2:
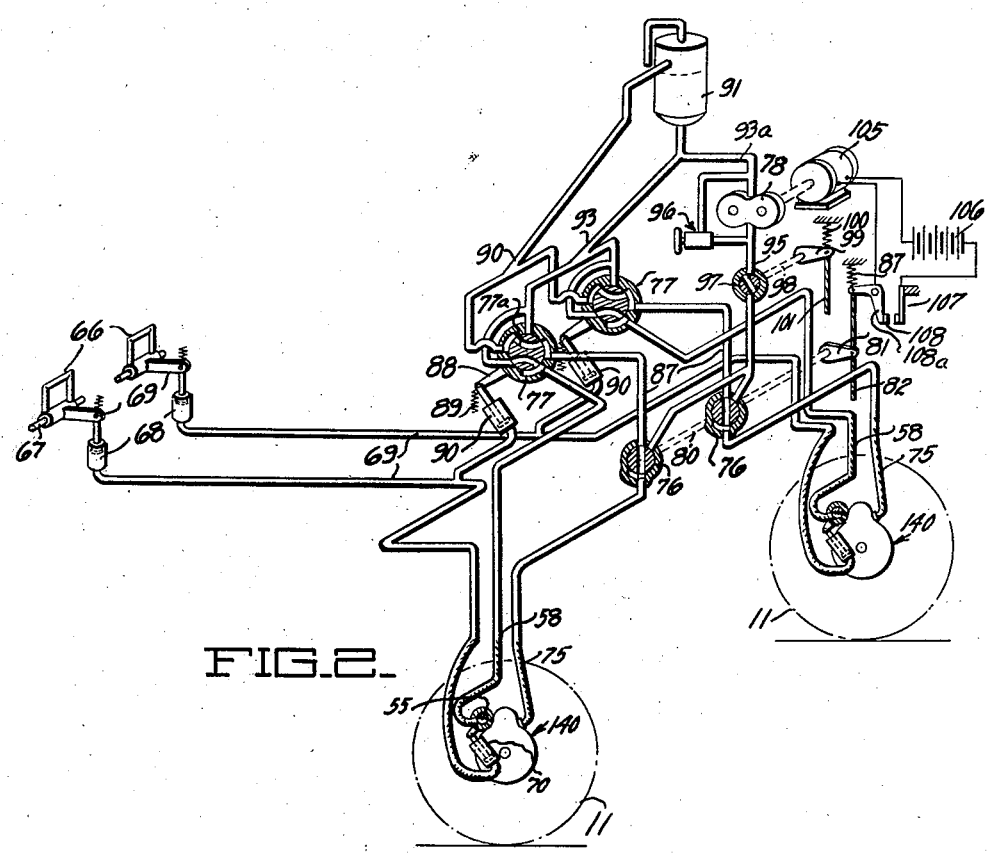
Fig. 2 is a schematic perspective view of the hydraulic controls embodying the present invention.

When the aircraft is in normal condition of rest on the ground, which condition is indicated in Figs. 1 and 2, the piston 13 is telescoped into the cylinder 14, as will be noted by comparing the full and dotted lines of Fig. 1. Therefore, spring 87 will hold the cable 82 in raised position. Suitable stop means (not shown) are provided to hold the shaft 80 from rocking counter-clockwise of its position illustrated in Fig. 2.

The rotatable elements of the braking selector valves 77 are connected to arms 88 normally urged counter-clockwise into their positions illustrated in Fig. 2 by springs 89. Each of these arms is connected to the piston of a hydraulic cylinder 90 communicating with the respective brake control lines 69. The springs 89 are considerably weaker than springs 73 (Fig. 5) so that application of pressure on the brake lines 69 by the pedals 66 will first result in rocking the respective valve elements 77a of valves 77 from their full line positions shown in Fig. 7 to their dotted line positions indicated in that figure, suitable stops (not shown) being provided to limit the movement of each element 77a in one or the other of its positions.

When no pressure is applied to the pedals 66, which condition is illustrated in Fig. 1, each of the elements 77a communicates the respective line 87 with a tube 90 which is connected to the top of a vented reservoir 91, above the fluid level of the reservoir. Therefore, the intake port of each unit 140 will be communicated with the upper part of reservoir 91. Consequently the wheels are free to rotate and if any hydraulic fluid remains in the lines 75, 82 and 90 it will be rapidly drained during the first few revolutions of the wheels so that no drag due to forcing the hydraulic fluid through the units 140 will be incurred. In this condition of the system the discharge lines 58 are communicated by a lower passage in the elements 77a of valves 77 with a tube 93 leading to the bottom of the reservoir 91. Consequently, any fluid in the units 140 will be forced into the lines 58 and thence into bottom of the reservoir 91.

Figure 7:
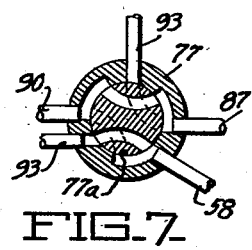
Fig. 7 is a transverse view of one of the braking selector valves.

Upon depression of a brake pedal 66 to brake its associated wheel the associated element 77a will first be set by the piston of cylinder 90 into its alternate position indicated by the dotted lines of Fig. 7, resulting in fluid from the bottom of the reservoir 91 passing by gravity along line 93 through the upper passage of element 77a, through line 87, valve 76 and line 75 into the intake port 74 of the respective unit 140, enabling the gears of the unit to force the same into the discharge line 58. Also, the lower passage of element 77a of valve 77 will communicate the line 58 with line 90 leading to the top of reservoir 91.

Pressure on each pedal 66, after causing valve 77 to be set, results in actuation of the piston 72 of cylinder 70 to rock the respective brake valve 55, thereby restricting the discharge of the brake fluid through the associated unit 140 and consequently braking the wheels 11 an amount dependent on the depression of the pedals.

In view of the fact that the valves 55 are located in the units 140 no high fluid pressure is transmitted through any of the hydraulic lines. Further, in view of the valve action utilized to brake the wheels, the force required to operate the pedals 66 is relatively light.

Describing now the means for operating the wheel units as motors to rotate the wheels prior to landing, so as to drive the same at a peripheral velocity substantially equal to the ground speed of the aircraft, a branch 93a of the line 93 (Fig. 2) connects the reservoir with the intake of the pump 78 while the discharge of the pump is connected through line 95 to each of the selector valves 76. A speed control valve 97 is located in the line 95 and has an arm 99 attached to the shaft 98 thereof. A spring 100 normally holds arm 99 and the rotatable element of the valve 97 in a counter-clockwise position wherein the valve entirely restricts fluid in the line 95. A cable 101 (see also Fig. 1) is connected to the arm 99 and is suitably guided by rollers 102 which are mounted on the framework of the aircraft. The lower end of the cable 101 is attached to an arm extending from a vane 103 pivotally mounted at 104 to one of the cylinders 14. When the wheels are in extended position, the vane 103 is located below the hull 12 and in the air-stream. Thus, the rate of flow of the fluid through the line 95 may be varied in accordance with the air speed of the aircraft.

An adjustable pressure regulator valve 96 of conventional design is preferably arranged across the intake and exhaust ports of pump 78. The pump is driven by an electric motor 105 connected in circuit with a source of power 106. Said circuit is adapted to be closed by a set of switch contacts 107, 108, the former carried by a bell crank 108a pivotally mounted on the aircraft framework and connected to cable 82.

When the aircraft is in normal condition of flight with the wheels 11 in their retracted positions 11a (Fig. 1), the arrangement of rollers 84 and 85 relative to each other is such that even though the pistons 13 are extended relative to cylinders 14, the cable 82 will be slack allowing spring 87 to retain the bell crank 108a and arm 81 in the position shown in Fig. 2 thus holding the motor circuit contacts 107 open. When it is desired to land the aircraft the handle 21 of control valve 22 (Fig. 1) is moved from its current dotted line position to its full line position to extend the wheels to landing position. The wheels will then take up their positions illustrated at 11b and the cable 82 will be pulled taut by the extended pistons 13, rocking bell crank 108a to close the contacts 107, 108 so as to operate the motor 105. Also, the cable 82 will rock the arm 81 to set the valve 76 to communicate line 95 with line 75. Further, valve 97 will be opened by air pressure against vane 103 resulting in fluid being forced through lines 95 and 75 into the units 140 to drive the intermeshing gears 144 and 48 whereby to rotate the wheels 11. The spring 100 and area of the vane 103 should be so proportioned as to control the speed of the wheels at a rate at least approximately commensurate with the relative velocity between the aircraft and the ground.

As the plane lands the pistons 13 telescope into the cylinders 14 in performing their shock absorbing functions resulting in the wheels assuming a position substantially as shown in full lines in Fig. 1 thus slackening the cable 82 sufficiently to allow spring 87 to rock the elements of valves 76 into the positions shown in Fig. 2 and at the same time opening the contacts 107, 108 to break the motor circuit. Consequently, at this instant the fluid pressure is removed from the intake of the units 140 and the system will assume its "free running" condition described hereinabove, permitting the aircraft to move freely until it is desired to apply a braking force.

Figure 8:
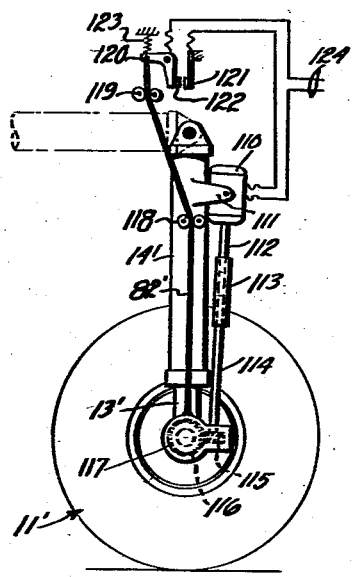
Fig. 8 is a side view of a modified form of wheel spinning control applied to landing wheels incorporating the conventional form of friction brakes.

Fig. 8 illustrates an alternative embodiment of certain aspects of the invention. This arrangement is intended to be used with the conventional form of friction brake or with any other form of brake and comprises an electric motor 110 pivoted in trunnions extending from brackets 111 on the oleo cylinders 14'. The motor shaft 112 is connected through an extensible and telescoping coupling 113 with a shaft 114 connected through spiral gears 115 and 116 to the hub of landing wheel 11'. From the above it will be seen that a driving connection is maintained by the motor and the wheel irregardless of the relative positions of the piston 13' and cylinder 14' with respect to each other.

A cable 82', secured at its lower end to a housing 117 for the gears 115 and 116, is guided between two pairs of rollers 118 and 119 arranged relative to each other in the manner indicated in Fig. 8. The former rollers 118 are rotatably mounted on cylinder 14' while rollers 119 are mounted on the aircraft framework. The upper end of the cable 82' is connected to a bellcrank 120 pivoted on the framework and having a contact 122 formed thereon. A spring 123 normally maintains the bell crank in a position to hold contact 122 out of circuit closing engagement with a stationary contact 121, these contacts being located in the power circuit 124 of motor 110.

When the wheels 11' are moved into extended position as an incident to a landing operation the extended piston 13' draws cable 82' downwardly against the action of spring 123, thereby closing the contacts 122 and 123 to energize the wheel spinning motor 110, suitable means (not shown) being preferably provided to control the motor at a speed commensurate with the landing speed of the aircraft. As the aircraft lands, the piston 13' telescopes into the cylinder 14', slackening the cable 82' and thereby allowing spring 123 to open the contacts 122 and 123. If desired an overrunning clutch may be provided in the drive between the motor and the wheel to permit the motor to come to rest before the wheel stops.

Referring to Fig. 1 of the preferred embodiment an auxiliary manual control of the pump 78 may, if desired, be provided to supplant gravity in filling the intake lines 75 with fluid. This control comprises arms 146 and 149 fixed to shafts 80 and 98, respectively, each rockable clockwise by solenoids 147 and 150, respectively, so as to energize the pump motor 105 and effect an open communication between the bottom of reservoir 91 and the intake lines 75. The solenoids are provided in circuit with a source of energy 106 and a switch 148.

Having thus described the invention, what I claim as new and desire to secure by Letters Patent is:

1. In an aircraft having a landing wheel, and a shock absorber between said wheel and said aircraft, the combination with means for moving said wheel from a retracted position to an extended position relative to said aircraft; of means controlled by said last mentioned means upon operation thereof for rotating said wheel, and means controlled by said shock absorber upon actuation thereof by said aircraft upon landing for rendering said wheel rotating means ineffective.

2. In an aircraft having a landing wheel, the combination with means for moving said wheel from a retracted position to an extended position relative to said aircraft; of motor driven means controlled by said last mentioned means upon operation thereof for continuously rotating said wheel, and means controlled by the impact between said aircraft and the ground upon landing for rendering said wheel rotating means ineffective.

3. In an aircraft having a landing wheel and a shock absorber between said wheel and said aircraft, the combination with means for moving said wheel from a retracted position to an extended position relative to said aircraft; of means controlled by said last mentioned means for rotating said wheel, means responsive to the forward speed of said aircraft for controlling the speed of said wheel rotating means, and means controlled by said shock absorber upon actuation thereof by said aircraft upon landing for rendering said wheel rotating means ineffective.

4. In an aircraft having a landing wheel, and a shock absorber between said wheel and said aircraft, the combination with means for moving said wheel from a retracted position to an extended position relative to said aircraft; of means including an electric motor for rotating said wheel; an electric power circuit for said motor including a switch; means controlled by said first mentioned means for closing said switch and means controlled by said shock absorber upon actuation thereof upon landing for opening said switch.

5. In an aircraft having a landing wheel; the combination of a fluid motor for rotating said wheel, a fluid power circuit for said motor, a valve in said power circuit, and means responsive to the air speed of said aircraft for controlling said valve.

6. In an aircraft having a landing wheel, and a shock absorber between said wheel and said aircraft; the combination with means for moving said wheel from a retracted position to an extended position relative to said aircraft, an energy transmitting device operatively connected to said wheel, means for controlling said device to operate as a brake, means for controlling said device to act as a motor, means responsive to said first mentioned means upon operation thereof to cause operation of said last mentioned controlling means, and means responsive to actuation of said shock absorber by said aircraft upon landing for conditioning said first mentioned controlling means to control said device.

7. In an aircraft having a landing wheel, the combination with means for moving said wheel from retracted position to extended position relative to said aircraft; of an energy transmitting device operatively connected to said wheel and selectively operable as a motor and as a brake, means responsive to said first mentioned means upon operation thereof to condition said device to operate as a motor, and means controlled by the impact between said aircraft and the ground upon landing for conditioning said device to operate as a brake.

8. In an aircraft having a landing wheel, and a shock absorber between said wheel and said aircraft; the combination with means for moving said wheel from retracted position to extended position relative to said aircraft; of an energy transmitting device operatively connected to said wheel and selectively operable as a motor and as a brake, means responsive to said first mentioned means upon operation thereof to condition said device to operate as a motor, and means controlled by said shock absorber in response to landing said aircraft for conditioning said device to operate as a brake.

9. In an aircraft having a landing wheel, the combination with means for moving said wheel from retracted position to extended position relative to said aircraft; of an energy transmitting device operatively connected to said wheel and selectively operable as a motor and as a brake, means responsive to said first mentioned means upon operation thereof to cause said device to operate as a motor, and means controlled by the impact between said aircraft and the ground upon landing for rendering said last mentioned means ineffective and for conditioning said device to operate as a brake.

10. In an aircraft having a landing wheel the combination with means for moving said wheel from retracted position to extended position relative to said aircraft; of means including a fluid displacement device selectively operable as a motor and as a brake, means responsive to said first mentioned means upon operation thereof to apply fluid under relatively high pressure to said device whereby to cause said device to operate as a motor, and means responsive to said aircraft upon landing thereof to apply fluid to relatively low pressure to said device whereby to condition said device to operate as a brake, and means for variably restricting said fluid from passing through said device whereby to cause said device to operate as a brake.

11. In an aircraft having a landing wheel, the combination with means for moving said wheel from retracted position to extended position relative to said aircraft; of means including a hydraulic fluid displacement device selectively operable as a motor and as a brake, means responsive to said first mentioned means upon operation thereof to apply hydraulic fluid under pressure to said device whereby to cause said device to operate as a motor, means responsive to said aircraft upon landing thereof to render said last mentioned means ineffective, a normally inoperative brake lever, and means responsive to said brake lever upon operation thereof for applying fluid to said device and for variably restricting said fluid from passing through said device whereby to cause the same to act as a brake.

FRED N. SCHWEND.